United States Patent [19]

Hawkins

[11] Patent Number: 5,625,917
[45] Date of Patent: May 6, 1997

[54] FOAM PIPELINE PIG WITH SEAL CUPS

[76] Inventor: Ronald E. Hawkins, 11907 Doretta, Montgomery, Tex. 77356

[21] Appl. No.: 614,314

[22] Filed: Mar. 12, 1996

[51] Int. Cl.$^6$ .................................................. B08B 9/02
[52] U.S. Cl. .................................................. 15/104.061
[58] Field of Search ................................ 15/3.5, 104.061

[56] References Cited

U.S. PATENT DOCUMENTS

| | | | |
|---|---|---|---|
| 3,659,305 | 5/1972 | Powers | 15/104.061 |
| 4,413,370 | 11/1983 | Payne et al. | 15/104.061 |
| 4,509,222 | 4/1985 | Knapp | 15/104.061 |
| 4,720,884 | 1/1988 | Ralls | 15/104.061 |
| 4,767,603 | 8/1988 | Byrd et al. | 15/104.061 |
| 5,127,125 | 7/1992 | Skibowski | 15/104.061 |
| 5,384,929 | 1/1995 | Smith | 15/104.061 |

*Primary Examiner*—David Scherbel
*Assistant Examiner*—Terrence R. Till
*Attorney, Agent, or Firm*—Kenneth A. Roddy

[57] ABSTRACT

A pipeline pig having an elongate generally cylindrical bullet-shaped body formed of resilient foamed material having a rear end and a nose portion with a resilient rear seal cup secured to the rear end and a resilient front seal cup secured to its forward end near the nose portion. The resilient seal cups have apertures through their central portions and a circumferential rearward facing peripheral lip configured to engage the inner wall of the pipeline. The propelling fluid pressure is transmitted to the rear cup lip to engage it in sealing relation on the inner wall of the pipeline and passes through the rear cup apertures and is propagated throughout the foam material of the body to radially expand the body and exert a radial force on the front cup lip to radially expand and firmly engage the front cup lip in sealing relation on the inner wall of the pipeline. A portion of the propelling fluid pressure propagated throughout the foam material of the body passes to the exterior of the body to exert a propelling force on the front cup lip downstream from the rear cup lip, and a portion of the propelling fluid pressure propagated throughout the foam material of the body passes through the front cup apertures and is propagated throughout the foam material of the nose portion to the exterior of the nose portion and increases turbulence in the pipeline in front of the pig.

11 Claims, 2 Drawing Sheets

FOAM PIPELINE PIG WITH SEAL CUPS

BACKGROUND OF THE INVENTION

1. Field of the Invention

This invention relates generally to pipeline pigs, and more particularly to a pipeline pig having a body formed of resilient foam material and rear and front resilient seal cups apertured to transmit the propelling fluid pressure to both cups and throughout the foam material of the body to radially expand the cups and increase turbulence in the pipeline in front of the pig.

2. Brief Description of the Prior Art

Pipeline pigs are propelled by fluid pressure through the interior of pipelines to clean sludge, scale, debris, and other materials from the inner surfaces of the pipeline. Pipeline pigs are also used to separate different types of products which may be travelling through the same pipeline.

Conventional cup type pipeline pigs usually have two or more resilient cups mounted on an elongate rigid central shaft or on a hollow, generally cylindrical rigid body. The cups have a peripheral lip which extends radially to engage the interior of the pipeline and transmits a radial component of the propelling fluid pressure to the inner walls of pipeline to effect a tighter fit. Some cup type pigs may also be provided with wire brush members on their periphery for scraping the inner wall of the pipeline. Some cup type pipeline pigs may be provided with a tracking device which is usually mounted externally, and is thus subject to being separated and lost.

Although these cup type pipeline pigs have good sealing qualities, because of their substantially inflexible construction, they are not particularly suited for making short radius turns and will often become stuck or will allow fluid to bypass the pig. It is also possible for a steel shaft pipeline pig to cause sparking, should the shaft contact the inner surface of a steel pipeline. In some instances, the weight of the conventional cup type pipeline pigs causes premature wear or distortion of the cup members which can result in fluid leakage. Cup type pipeline pigs are also limited in the type of and quantity of wire brushes which may be installed Another problem with conventional cup type pigs is that lip of the rearmost cup performs the primary sealing function and the lips of the cups at the forward end receive less fluid pressure and thus do not seal as well or clean as efficiently, and the drop in efficiency increases as the number of cups increase.

Conventional foam type pipeline pigs usually have a generally cylindrical body formed of polyurethane foam. The foam type pipeline pigs are much lighter in weight and are more flexible than the cup type pipeline pigs. However, their sealing properties are not as good, since most commonly known foam type pipeline pigs do not utilize a resilient lip cup seal. The foam type pigs also have more surface area for the installation of peripheral brushes than cup type pigs. However, foam type pigs with brushes have more fluid bypass problems than foam pigs without brushes, due to the lack of a resilient lip cup seal. Some foam type pipeline pigs may be provided with an interior cavity for containing a tracking device which reduces the possibility of the device from being separated and lost.

There are several patents which disclose various foam type pipeline pigs.

Powers, U.S. Pat. No. 4,016,620 discloses a foam type pipeline cleaning pig having a cylindrical open cell foam core with a flexible impervious jacket made of adhesive material which surrounds the outer wall of the core and is covered by abrasive material such as sand, glass, diamond dust, silicon carbides, etc. The abrasive material may also be of the type that contains sharp steel bristles imbedded in a web backing which is secured to the adhesive jacket.

Knapp, U.S. Pat. No. 4,077,079 discloses a foam type pipeline pig having a cylindrical bullet-shaped body of foamed elastomeric plastic that is wrapped with a spiraled cloth which is joined into the body by the elastomeric material which forms the body. The cloth wrapping contains U-shaped wire staples which extend outwardly to form an abrasive surface for cleaning the pipeline.

Girard, U.S. Pat. No. 4,083,076 discloses a foam type pipeline pig having a cylindrical bullet-shaped body of foamed elastomeric plastic that is bonded onto an elongate central column or shaft which extends longitudinally from each end of the body. The shaft is made of high durometer polyurethane, or other material, which is incompressible in the longitudinal direction but is flexible to forces perpendicular to its longitudinal axis to allow the pig to bass obstructions and negotiate moderate bends.

Knapp, U.S. Pat. No. 4,509,222 discloses a pipeline pig having a generally cylindrical relatively hard body formed of high density polyurethane with a pointed nose and a plurality of radially extending flanges or ribs longitudinally spaced along the circumference of the body and a rear area surrounded by a tapered lip which receives the propellant fluid. The body has a central enclosed cavity filled with a low density polyurethane foam and a small restricted opening extending through the rear wall of the cavity. The internal foam filled cavity is exposed to pipeline pressure through the restricted opening at the rear. The restricted opening materially limits a pressure wave from fluid under pressure from entering the foam filled cavity. In the event of a pressure surge, the pressure wave is slowly propagated through the foam which serves as a shock absorber to prevent blowing out the nose of the pig.

The present invention is distinguished over the prior art in general, and these patents in particular by a pipeline pig having an elongate generally cylindrical bullet-shaped body formed of resilient foamed material having a rear end and a nose portion with a resilient rear seal cup secured to the rear end and a resilient front seal cup secured to its forward end near the nose portion. The resilient seal cups have apertures through their central portions and a circumferential rearward facing peripheral lip configured to engage the inner wall of the pipeline. The propelling fluid pressure is transmitted to the rear cup lip to engage it in sealing relation on the inner wall of the pipeline and passes through the rear cup apertures and is propagated throughout the foam material of the body to radially expand the body and exert a radial force on the front cup lip to radially expand and firmly engage the front cup lip in sealing relation on the inner wall of the pipeline. A portion of the propelling fluid pressure propagated throughout the foam material of the body passes to the exterior of the body to exert a propelling force on the front cup lip downstream from the rear cup lip, and a portion of the propelling fluid pressure propagated throughout the foam material of the body passes through the front cup apertures and is propagated throughout the foam material of the nose portion to the exterior of the nose portion and increases turbulence in the pipeline in front of the pig.

SUMMARY OF THE INVENTION

It is therefore an object of the present invention to provide a pipeline pig having a body formed of resilient foam material and rear and front resilient seal cups which form a seal on the inner wall of a pipeline for cleaning the inner wall of the pipeline.

It is another object of this invention to provide a pipeline pig having a body formed of resilient foam material and rear and front resilient seal cups which are apertured to transmit the propelling fluid pressure to both cups and throughout the foam material of the body to radially expand the cups and increase turbulence in the pipeline in front of the pig.

Another object of this invention is to provide a pipeline pig having a body formed of resilient foam material and rear and front resilient seal cups wherein the propelling fluid pressure can pass to each of the cups to provide substantially equal sealing pressure on the effective sealing surfaces of both cups.

Another object of this invention is to provide a pipeline pig having a body formed of resilient foam material and rear and front resilient seal cups with abrading brushes or abrasive material on its exterior for scraping or abrading the inner wall of the pipeline.

Another object of this invention is to provide a pipeline pig having a body formed of resilient foam material and rear and front resilient seal cups which is substantially flexible and capable of making short radius turns.

A further object of this invention is to provide a pipeline pig having a body formed of resilient foam material and rear and front resilient seal cups which will not cause sparking.

A still further object of this invention is to provide a pipeline pig having a body formed of resilient foam material and rear and front resilient seal cups which is simple in construction, economical to manufacture and reliable in use.

Other objects of the invention will become apparent from time to time throughout the specification and claims as hereinafter related.

The above noted objects and other objects of the invention are accomplished by a pipeline pig having an elongate generally cylindrical bullet-shaped body formed of resilient foamed material having a rear end and a nose portion with a resilient rear seal cup secured to the rear end and a resilient front seal cup secured to its forward end near the nose portion. The resilient seal cups have apertures through their central portions and a circumferential rearward facing peripheral lip configured to engage the inner wall of the pipeline. The propelling fluid pressure is transmitted to the rear cup lip to engage it in sealing relation on the inner wall of the pipeline and passes through the rear cup apertures and is propagated throughout the foam material of the body to radially expand the body and exert a radial force on the front cup lip to radially expand and firmly engage the front cup lip in sealing relation on the inner wall of the pipeline. A portion of the propelling fluid pressure propagated throughout the foam material of the body passes to the exterior of the body to exert a propelling force on the front cup lip downstream from the rear cup lip, and a portion of the propelling fluid pressure propagated throughout the foam material of the body passes through the front cup apertures and is propagated throughout the foam material of the nose portion to the exterior of the nose portion and increases turbulence in the pipeline in front of the pig.

DESCRIPTION OF THE PREFERRED EMBODIMENT

Figure 1:
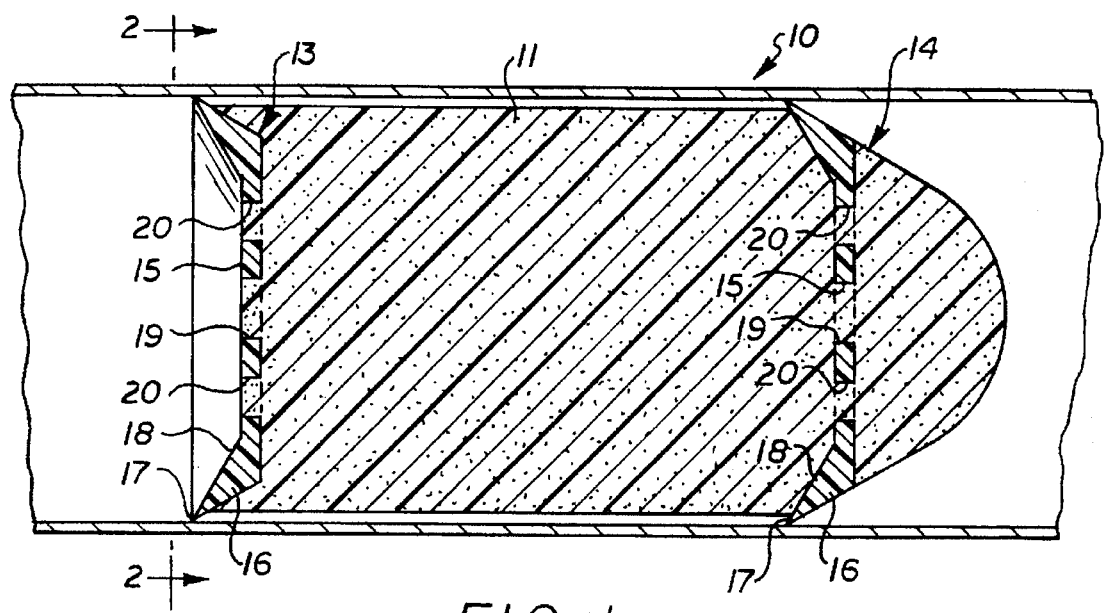
FIG. 1 is a longitudinal cross section view of a preferred foam pipeline pig with seal cups in accordance with the present invention.
Figure 2:
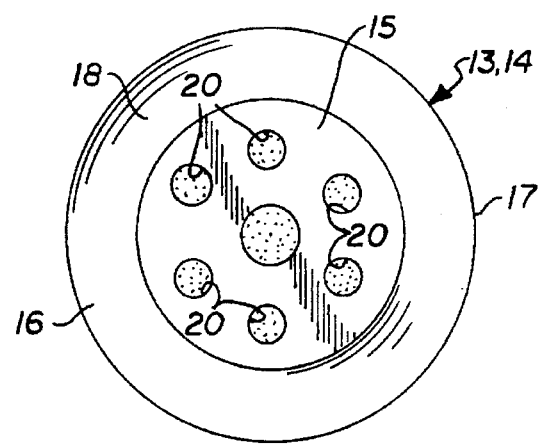
FIG. 2 is rear end view of the resilient cup members of the foam pipeline pig with seal cups.

Referring to the drawings by numerals of reference, there is shown in FIGS. 1 and 2, a preferred foam pipeline pig with seal cups 10. The pipeline pig 10 has an elongate body 11 formed of resilient foamed material, preferably a polyurethane foam material molded in a generally bullet-shaped configuration having a rounded nose portion 12.

The foam plastic body 11 has a resilient rear cup member 13 at its rearward end and a resilient front cup member 14 near its forward end which are integrally formed with the foam plastic body 11, preferably during the molding operation.

The cup members 13 and 14 are formed of a suitable resilient non-foamed material, such as a urethane, polyurethane, or neoprene. Each cup member 13 and 14 has a flat circular central portion 15 with a radially extending circumferential flange or rib 16 which extends angularly outward and rearwardly from the central portion and terminates at a peripheral lip 17. The interior of the circumferential rib 16 defines an inner frustro-conical surface 18.

As best seen in FIG. 2, the central portion 15 of each cup member 13 and 14 is provided a central aperture 19 and a plurality of circumferentially spaced apertures 20 radially outward from the central aperture which extend through the central portion. The apertures are shown as being circular but it should be understood that the apertures may be of other configurations.

Referring again to FIG. 1, during the molding operation, the foam material of the body 11 will fill the apertures 19 and 20 of the rear cup member 13 but not pass to the exterior of the rear cup and will flow through and fill the apertures 19 and 20 of the front cup member 14 such that the foam body material is on both the front and rear sides of the front cup. It should be understood that the central portion 15 of the cup members 13 and 14 and/or the interior surfaces of the apertures 19 and 20 may grooved, threaded, or otherwise provided with an interior surface to facilitate secure anchoring of the cup members with the foam body material.

Also during the molding operation, the foam material of the body 11 will substantially cover the exterior angular surface of the radially extending circumferential rib 16 of the rear cup 13 leaving the tip 17 exposed, and will fill the inner frustro-conical surface 18 of the front cup member 14, but will not cover the exterior angular surface of the radially extending circumferential rib 16 of the front cup 14. In a preferred embodiment the outer periphery of the bullet-shaped nose portion 12 of the body 11 forms a continuation of the exterior angular surface of the radially extending circumferential rib 16 of the front cup 14.

The peripheral lip 17 of each cup 13 and 14 engages the interior wall of the pipeline. The propelling fluid exerts a force on the rear cup 13 which is greater than the pressure in the pipeline at the nose 12 of the pig 10. The propelling fluid transmits a radial component of the propelling fluid pressure to the inner frustro-conical surface 18 to firmly engage the peripheral lip 17 of the rear cup 13 in sealing relation on the inner wall of the pipeline to effect a tighter fit as the pig passes through the pipeline. At the same time, the propelling fluid pressure passes through the apertures 19 and 20 of the rear cup 13 and is propagated throughout the foam material of the body 11 and exerts a force on the rear surface of the front cup 14 and transmits a radial component of the propelling fluid pressure to the inner frustro-conical surface 18 of the front cup 14 to radially expand and firmly engage the peripheral lip 17 of the front cup 14 in sealing relation on the inner wall of the pipeline. The propelling fluid pressure permeating the resilient foam body also causes expansion of foam material inside the frustro-conical surface 18 of the front cup 14 to radially expand the peripheral lip 17 of the front cup 14. The combination of the propelling fluid and foam pressure on the cups 13 and 14 causes a constant sealing pressure at both peripheral lips 17 and results in providing major sealing at each cup, and creates a better seal than is possible with other non-foam two-cup pigs.

The radial component of the propelling fluid pressure which passes through the apertures 19 and 20 of the rear cup 13 is propagated throughout the foam material of the body 11 and passes to the exterior of the cylindrical portion of the body to exert a propelling force on peripheral lip 17 of the front cup 14 downstream from the lip 17 of the rear cup 13. An axial component of the propelling fluid pressure also passes through the apertures 19 and 20 of the front cup 14 and is propagated throughout the foam material of the nose portion 12 to the exterior of the pig and increases turbulence in the pipeline in front of the pig.

Thus, the propelling fluid pressure can pass to each of the cups 13 and 14 to provide substantially equal sealing pressure on the effective sealing surfaces of both cups and also increases turbulence in the pipeline in front of the pig to facilitate the movement of liquids and solids and prevent settlement ahead of the pig and reduce the possibility of the pig riding over material on the bottom of the pipeline.

The combination of the foam body and double seal features provide the present pipeline pig with flexibility which allows it to pass through pipeline distortions and partially closed valves better than conventional rigid body cup pigs and allow it to seal better than conventional foam pigs.

Figure 3:
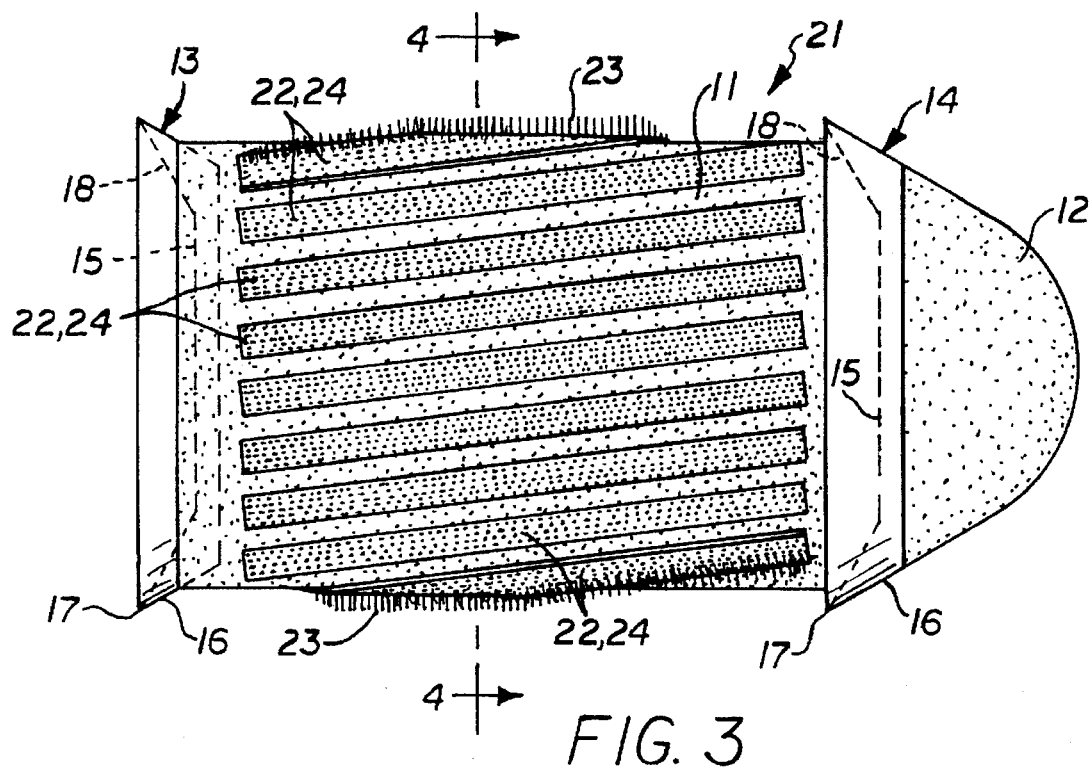
FIG. 3 is a side elevation view of a foam pipeline pig with seal cups having an exterior surface adapted for scraping the pipeline.
Figure 4:
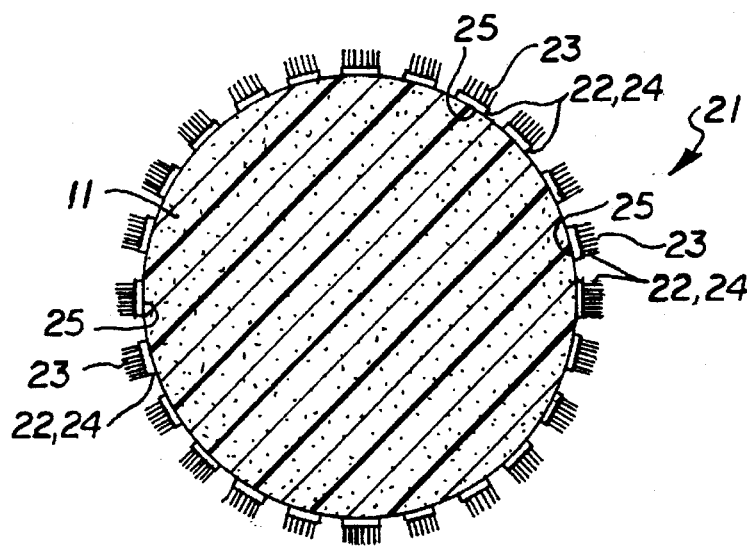
FIG. 4 is transverse cross section view through foam pipeline pig with seal cups of FIG. 3, taken along line 4—4.

Referring now to FIGS. 3 and 4 of the drawings, there is shown a modification of the present foam pipeline pig with seal cups 21 which is provided with a plurality of wire brushes 22 on its exterior. The pipeline pig 21 of FIGS. 3 and 4 has the same elongate body 11 formed of foamed plastic material molded in a generally bullet-shaped configuration with a rounded nose portion 12 and the same resilient rear and front cup members 13 and 14 as described above with reference to FIGS. 1 and 2. The cups 13 and 14 have apertures (not shown) to pass the propelling fluid pressure through the foam body as previously described. The description of these components and their operation will not be described in detail to avoid repetition.

In the embodiment of FIGS. 3 and 4, a plurality of wire brush members 22 are secured to the exterior of the cylindrical portion of the body 11. In this modification, the peripheral lips 17 of the cup members 13 and 14 extend radially outward a distance beyond the circumference of the cylindrical portion of the body 11 and terminate in a plane approximately the same as the outer periphery of the wire bristles 23 of the brush members 22. The wire brush members 22 may be of conventional construction known in the art. For example, they may be made of wire bristles which are secured to a rigid backing plate or flexible webbing material, or they may be in the form of U-shaped staples which extend outwardly from a cloth backing.

In a preferred embodiment, each of the wire brushes 22 are formed of bristles 23 which are secured to an elongate generally rectangular base strip 24 of flexible material. The elongate base strips 24 are secured, by conventional means, such as an adhesive 25 or bonding agent to the cylindrical portion of the body 11, and are oriented parallel to one another in an angular plane relative to the longitudinal axis of the pig 21. The wire brushes 22 may cover approximately 90% of the cylindrical surface of the pig.

In the embodiment of FIGS. 3 and 4, the pressure of the propelling fluid exerts a force on the rear cup 13 which is greater than the pressure in the pipeline at the nose 12 of the pig 21. The propelling fluid transmits a radial component of the propelling fluid pressure to firmly engage the peripheral lip 17 of the rear cup 13 in sealing relation on the inner wall of the pipeline to effect a tighter fit as the pig passes through the pipeline. At the same time, the propelling fluid pressure passes through the apertures of the rear cup 13 and is propagated throughout the foam material of the body 11 and exerts a force on the rear surface of the front cup 14 and transmits a radial component of the propelling fluid pressure to the inner frustro-conical surface 18 of the front cup 14 to radially expand and firmly engage the peripheral lip 17 of the front cup 14 in sealing relation on the inner wall of the pipeline. The propelling fluid pressure permeating the resilient foam body also causes expansion of foam material inside the frustro-conical surface 18 of the front cup 14 to radially expand the peripheral lip 17 of the front cup 14.

The radial component of the propelling fluid pressure which passes through the apertures of the rear cup 13 is propagated throughout the foam material of the body 11 and against the underside of the base strips 24 of the brushes 22 to radially expand the foam material of the body and firmly engage the bristles 23 against the inner wall of the pipeline. A portion of the radial component of the propelling fluid pressure passes to the exterior of the cylindrical portion of the body 11 between the base strips 24 and exerts a propelling force on the peripheral lip 17 of the front cup 14 downstream from the lip 17 of the rear cup 13. An axial component of the propelling fluid pressure also passes through the apertures of the front cup 14 and is propagated throughout the foam material of the nose portion 12 to the exterior of the pig and increases turbulence in the pipeline in front of the pig.

Thus, the propelling fluid pressure can pass to each of the cups 13 and 14 to provide substantially equal sealing pressure on the effective sealing surfaces of both cups, to firmly engage the brushes on the inner wall of the pipeline, and to increase turbulence in the pipeline in front of the pig to facilitate the movement of liquids and solids and prevent settlement ahead of the pig and reduce the possibility of the pig riding over material on the bottom of the pipeline.

Although the foam pipeline pig with seal cups has been described as having a plurality wire brushes for abrading the inner surface of the pipeline, it should be understood that strips carrying other abrasive material may be secured to the circumference of the pig such as sand, glass, diamond dust, silicon carbides, etc.

The combination of the foam body, with the wire brush and double seal features provide the present pipeline pig with flexibility which allows it to pass through pipeline distortions and partially closed valves better than conventional rigid body cup pigs and allows it to seal better than conventional foam pigs having peripheral brushes.

While this invention has been described fully and completely with special emphasis upon preferred embodiments, it should be understood that within the scope of the appended claims the invention may be practiced otherwise than as specifically described herein.

I claim:

1. A pipeline pig of the type to be propelled through a pipeline by a pressure gradient exerted by a propelling fluid in the pipeline, comprising in combination:
   an elongate one piece cylindrical body formed of resilient foamed material having a rear end a nose portion at a front end;
   an apertured rear cup of resilient non-foamed material at said rear end of said body having a circumferential rearward facing peripheral lip configured to engage the inner wall of the pipeline; and
   an apertured front cup of resilient non-foamed material near said body nose portion having a circumferential rearward facing peripheral lip configured to engage the inner wall of the pipeline;
   said resilient foamed material of said body being sufficiently porous and said rear cup and said front cup each being apertured such that the propelling fluid pressure passes from said rear cup through said resilient foamed material of said body to said front cup to provide substantially equal sealing pressure to said peripheral lips of both said cups.

2. A pipeline pig of the type to be propelled through a pipeline by a pressure gradient exerted by a propelling fluid in the pipeline, comprising:
   an elongate one piece cylindrical body formed of resilient foamed material having a rear end a nose portion at a front end;
   a rear cup of resilient non-foamed material secured to said body rear end having apertures through a central portion and a circumferential rearward facing peripheral lip configured to engage the inner wall of the pipeline; and
   a front cup of resilient non-foamed material secured to said body near said nose portion having apertures extending through a central portion and a circumferential rearward facing peripheral lip configured to engage the inner wall of the pipeline; wherein
   the propelling fluid pressure is transmitted to said rear cup lip to engage it in sealing relation on the inner wall of the pipeline and passes through said rear cup apertures and is propagated throughout the foam material of said body to radially expand said body and exert a radial force on said front cup lip to radially expand and firmly engage said front cup lip in sealing relation on the inner wall of the pipeline;
   a portion of the propelling fluid pressure propagated throughout the foam material of said body passes to the exterior of said body to exert a propelling force on said front cup lip downstream from said rear cup peripheral lip; and
   a portion of the propelling fluid pressure propagated throughout the foam material of said body passes through said front cup apertures and is propagated throughout the foam material of said nose portion to the exterior of said nose portion.

3. The pipeline pig according to claim 2 wherein
   said rear cup and said front cup each have a flat circular central portion with a radially extending circumferential rib extending angularly outward and rearwardly from said central portion and terminating at said peripheral lip.

4. The pipeline pig according to claim 3 wherein
   said rear cup and said front cup each have a flat circular central portion with a radially extending circumferential rib extending angularly outward and rearwardly from said central portion and terminating at said peripheral lip to define an interior frustro-conical surface.

5. The pipeline pig according to claim 3 wherein
   said rear cup and said front cup each have a central aperture and a plurality of circumferentially spaced apertures radially outward from said central aperture which extend through said central portion.

6. The pipeline pig according to claim 2 wherein
   said rear and front cups are bonded to said body to form an integral unit.

7. The pipeline pig according to claim 2 wherein
   said rear and front cups are secured on said body by a molding process to form an integral unit.

8. The pipeline pig according to claim 7 wherein:
   said rear cup and said front cup each have a flat circular central portion with a radially extending circumferential rib extending angularly outward and rearwardly from said central portion and terminating at said peripheral lip to define an interior frustro-conical surface;
   said rear cup and said front cup each have a central aperture and a plurality of circumferentially spaced apertures radially outward from said central aperture which extend through said central portion; and
   said resilient foamed material of said body fills said rear cup apertures but does not extend to the rear surface of said rear cup and said resilient foamed material extends through said front cup apertures such that said resilient foamed material is on both the front and rear sides of said front cup.

9. The pipeline pig according to claim 2 further comprising
   abrasive means on the outer surface of said body.

10. The pipeline pig according to claim 9 wherein
    said abrasive means comprises a plurality of backing strips secured to the outer surface of said body and said strips bearing outwardly facing abrasive material selected from the group consisting of wire bristles, sand, glass, diamond dust, and silicon carbides.

11. The pipeline pig according to claim 10 wherein
    said backing strips are elongate generally rectangular strips secured to the outer surface of said body in parallel circumferentially spaced relation; whereby
    a portion of the propelling fluid pressure propagated throughout the foam material of said body radially expands said body to exert a radial force on said backing strips to firmly engage said outwardly facing abrasive material on the inner wall of the pipeline.

* * * * *